Dec. 16, 1958  K. AHLBORG ET AL  2,864,669
METHOD FOR RECOVERING SULFUR AND ALKALI FROM WASTE LIQUORS
Filed Nov. 1, 1954
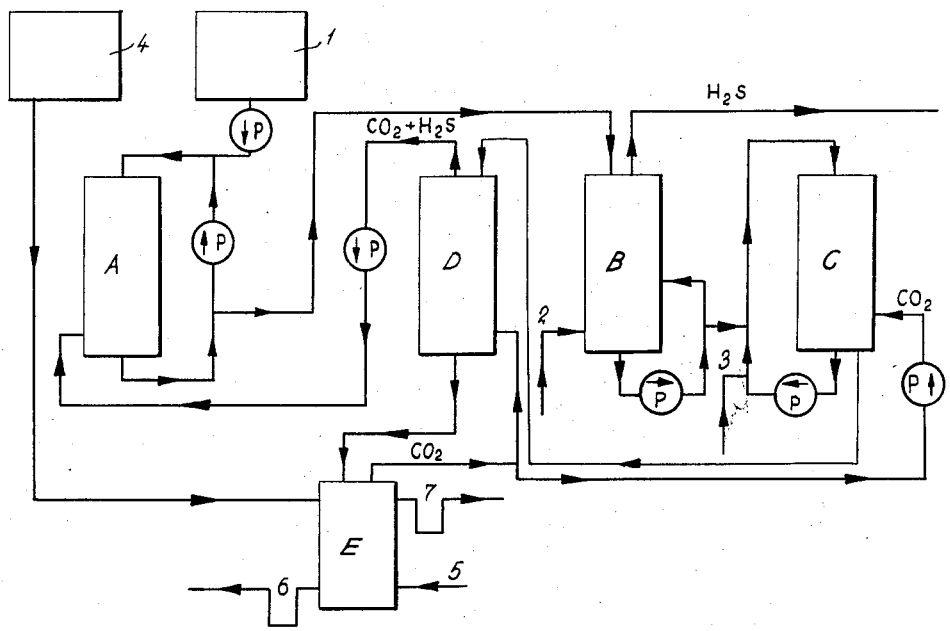
INVENTORS:
Knut Ahlborg
Karl Nicolaus Cederquist
by Howson & Howson
Attys.

2,864,669

Patented Dec. 16, 1958

2,864,669

METHOD FOR RECOVERING SULFUR AND ALKALI FROM WASTE LIQUORS

Knut Ahlborg and Karl Nicolaus Cederquist, Falun, Sweden, assignors to Stora Kopparbergs Bergslags Aktiebolag, Falun, Sweden, a joint stock company limited of Sweden Application November 1, 1954, Serial No. 466,132

13 Claims. (Cl. 23—131)

This invention relates to the recovery of chemicals from waste liquors derived from the production of pulp by the digestion of materials containing lignocellulose such as wood, straw, peat-moss (sphagnum), with alkali sulfite and/or bisulfite or bisulfite and free $SO_2$ in one or several stages and the invention is applicable in all such cases, where the resulting waste liquor contains lignosulfonates of alkali metals such as sodium lignosulfonate etc.

When such sodium containing waste liquors are evaporated completely or partially for instance to substantially complete dryness or to 40–60% dryness and then burned in a smelting furnace a smelt is obtained which consists essentially of soda, sodium sulfide and small amounts of sodium sulfate, sulfite and thiosulfate.

It is previously known to recover sulfur from solutions of this smelt soda in a process, where the solution is treated with carbonic acid, converting sodium carbonate and sodium hydroxide formed in the hydrolysis of the alkali sulfide into bicarbonate, which treatment is called herein carbonation, the sulfur then being removed from the bicarbonate solution in form of hydrogen sulfide by steam stripping under vacuum or by stripping with non-condensable gases such as air or flue gases generally at atmospheric pressure or slightly higher. The hydrogen sulfide may then be collected and burned to $SO_2$ in any suitable way.

The solution freed from sulfide sulfur can be reacted with gaseous $SO_2$ or an aqueous solution of $SO_2$ or with a bisulfite solution which may contain free $SO_2$ if desired, free and combined carbon dioxide being released in gaseous form (decarbonation) and a solution of $Na_2SO_3$ being obtained which can be treated further and converted into sulfite cooking liquor.

In order to obtain satisfactory sulfite cooking liquors in this process it is essential to prevent an appreciable formation of thiosulfate since too high a thiosulfate percentage in the sulfite cooking liquor can cause troubles in the digestion process, such as burnt cook, as well as essentially increased corrosive attacks on pipe lines and other equipment. The amount of thiosulfate in the cooking liquor should preferably not exceed 0.5 gr. $Na_2S_2O_3$ per litre.

Our test runs have shown that thiosulfate is formed either by oxidation of the sulfide sulfur in a soda smelt solution of a relatively high sulfide content at its contact with molecular oxygen containing gases, or by $SO_2$ or bisulfite in the decarbonation step if the carbonized and stripped solution still contains sulfide sulfur. Thus, we have found it essential that the carbonation is performed with oxygen-free carbon dioxide, preferably of 100% purity, and that the solution passing to the decarbonation step is completely or substantially completely freed from sulfide sulfur.

The primary object of the present invention is to provide a method which can reduce the costs of recovery of alkali and sulfur in the waste liquors.

A further object of the invention is to provide a method for the production of sulfite cooking liquor without any appreciable contents of thiosulfate.

According to the present invention the carbonation and the stripping of hydrogen sulfide are carried out twice in two separate steps exclusively using the concentrated oxygen-free carbon dioxide released in the decarbonation. It is not necessary to supply any additional carbon dioxide to the system from an extraneous source so that the process is self-supporting as to carbon dioxide. The inevitable losses of carbon dioxide in the stripping of hydrogen sulfide are fully covered by the carbonic acid combined as carbonate in the original soda smelt solution.

To carry out an almost complete stripping of hydrogen sulfide from a completely carbonated soda smelt solution, in one step an essential amount of heat is required, e. g. in form of steam. The pH value of the solution carbonated will raise appreciably during the stripping due to the formation of alkali carbonate which is caused partly by the reaction of the bicarbonate with the alkali sulfhydrate and, partly by the decomposition of the bicarbonate at increased temperature and reduced pressure. In order to achieve in such a case a satisfactory low sulfide sulfur percentage in the stripped solution 25–45% thereof has to be distilled off requiring at least as much steam as corresponds to the amount of water evaporated.

To reduce the heat costs in the stripping of the hydrogen sulfide according to the invention the removing of hydrogen sulfide from the carbonated solution in the first step is carried out incompletely by stripping with steam or uncondensable gas and then in a second step the soda smelt solution once again is carbonated (recarbonation) and remaining sulfide sulfur removed as hydrogen sulfide by passing carbon dioxide countercurrent to the recarbonated solution, e. g. in a column or tower wherein no supply of additional heat is necessary.

To maintain an adequate amount of carbon dioxide in the process the stripping of hydrogen sulfide in the second step does not allow appreciable losses of carbon dioxide. To entirely avoid that loss the carbon dioxide used for the carbonation in the first step is previously used for stripping hydrogen sulfide in the second step. In that manner the hydrogen sulfide removed in the second step also is brought back to the carbonation in the first step and is thus recovered in the following stripping step.

The removing of the remaining hydrogen sulfide by the carbon dioxide used for the carbonation in the first step is of essential importance for the maintenance of the stock of carbon dioxide in the system since, should the stripping of hydrogen sulfide in the second step be carried out by means of steam or an uncondensable gas, the losses of carbonic acid in both the strippings in total would be so great that the amount of carbon dioxide supplied to the system as carbonate in the original smelt soda solution would not cover all the losses.

Owing to the use of pure carbon dioxide free from uncondensable gases for the carbonation in the two steps losses are avoided of hydrogen sulfide as well as of carbonic acid in the carbonation, since the carbonation can be formed in a closed apparatus without requiring any uncondensable gases to be exhausted.

The sulfide-free smelt soda solution obtained can directly be reacted with gaseous $SO_2$, $SO_2$-solution or bisulfite solution with or without free $SO_2$ without risk of formation of thiosulfate, and simultaneously all carbon dioxide present is recovered in a pure state and in sufficient amount to cover the requirement of carbon dioxide for the carbonations as well as the losses of carbon dioxide exclusively caused by the stripping in the first step.

The soda and the sulfide concentrations of the raw soda liquor should not be higher than that of the bicarbonate formed in the carbonation and recarbonation which will remain in solution. Thus, in case of higher temperatures a higher concentration can be chosen, but due to said higher temperature a higher carbon dioxide pressure must be applied to cause a complete bicarbonate formation. The carbonation can be carried out between 10 and 80° C. and at a carbon dioxide pressure of 0-5 atm. gage pressure to give good results. However, the invention is not limited to said pressures and temperatures, but risk of losses of carbon dioxide will be higher particularly in the first stripping step if using higher temperatures and pressures.

The stripping of the carbonated smelt soda solution in the first step is preferably carried out under vacuum in a plate column or packed column and the supply of heat is most simply performed by blowing in fresh steam directly into the solution, but said supply can of course be carried out indirectly.

A high vacuum will promote the stripping of hydrogen sulfide, but in practice an absolute pressure of 50-300 mm. Hg has been found to give satisfactory results.

Thus, the amount of water to be removed will depend on the pressure under which the stripping is carried out as well as on the sulfur percentage allowed to remain in the solution. To obtain a substantially complete stripping in a one-stage process it is required that 25-45% of the water content of the solution is removed at an absolute pressure of 100 mm. Hg. When carrying out the hydrogen sulfide stripping according to the invention at such a pressure only 5-25% and usually not more than 5-15% of the solution are to be removed in the first stage to give, in the subsequent carbonation and stripping, a solution completely or substantially completely free from sulfide.

The carbonation in the second stage can be carried out under the same conditions of pressure and temperature as described above by reference to the first stage, but regard is to be taken of the fact that the bicarbonate content will be higher in the second stage due to the reduced alkali sulfide content causing risk of the crystallization of bicarbonate. The most simple way to avoid said trouble is to dilute the solution after the first stage stripping.

The stripping of hydrogen sulfide by means of carbon dioxide in the second stage can be carried out at atmospheric pressure as well as at increased or reduced pressure. The temperature can be varied within wide ranges, but should suitably be held at a value which is dependent on the temperature of the entering solution (20-50° C.).

The decarbonation can be carried out in a reaction tower of any known or suitable design such as a plate column, a packed column, or the like, wherein the bicarbonate solution is mixed with bisulfite or $SO_2$ solution and/or gaseous $SO_2$ in an amount at least equivalent to the bicarbonate amount. The bicarbonate solution is preferably introduced at the top of the reaction tower, the bisulfite solution being introduced at a somewhat lower level of the tower, to prevent $SO_2$ from escaping together with the effluent carbon dioxide. When the latter is used for carbonation also small amounts of $SO_2$ are harmful due to the formation of thiosulfate in the sulfide containing soda smelt solution. To completely free the sulfite or bisulfite solution from carbon dioxide said solution must be heated by supplying to the bottom of the reaction tower live steam or indirect heat in such an amount that no or only a small amount of steam leaves the top of the tower. Thus, the solution will leave the reaction tower having a temperature of about 100° C. and completely freed from carbonic acid.

In the following the invention will be described more in detail with reference to the accompanying flow sheet which exemplifies how the process can be carried out according to the invention.

A soda smelt solution of the following composition was introduced into the process:

| | |
|---|---|
| $Na_2CO_3$ | 44.5 grams per litre. |
| $Na_2S$ | 48.2 grams per litre. |
| $Na_2S_2O_3$ | 2.0 grams per litre. |
| pH | 12.2. |

The thiosulfate content of said solution is 0.3 gram per 10 grams $Na_2O$. The thiosulfate amount in the cooking liquor made up from said soda smelt solution can thus not be less than said value.

The solution was pumped from a tank into a closed carbonation tower A wherein the temperature was maintained at 50° C. The pressure was maintained at 1 atm. gage pressure by the introduction of pure $CO_2$, the solution being carbonated to such an extent that $Na_2CO_3$ and NaOH were converted into $NaHCO_3$, and the completely carbonated solution obtained a pH-value of about 8. The carbonation was facilitated by recirculation of the solution within the tower.

The carbonated solution was then transferred to a stripping column B working at about 100 mm. Hg absolute pressure and at a temperature of about 50-55° C. At the bottom of the stripping column B live steam was supplied at 2 causing 13% of the water content of the solution to distil off along with hydrogen sulfide. The stripped solution only contained about 0.5 gram $Na_2S$ per litre corresponding to 1% of the original sodium sulfide of the soda smelt. During the stripping a loss of carbon dioxide occurred corresponding to about 50% of the carbonic acid combined as carbonate in the original soda smelt solution. The pH-value of the stripped solution was about 10.

The solution stripped was then diluted at 3 with an equal volume of water and then pumped to a recarbonation tower C, where carbonation was carried out under the same conditions as used in the tower A. Due to the recarbonation the pH-value of the solution was decreased from about 10 to about 8.

From the recarbonation tower C the solution was transferred to a stripping tower D, into which simultaneously was introduced pure carbon dioxide counter-current to the said solution, the carbon dioxide coming from the column E, in which decarbonation was carried out. Carbon dioxide and hydrogen sulfide leaving the stripping tower D were passed to the carbonation tower A.

After the second stripping process the solution only contained 0.05 gr. $Na_2S$ per litre corresponding to 0.2% of the sodium sulfide in the original soda smelt. Thus in the second stage of the process 80% of the sulfide sulfur remaining in the solution from the first stage had been removed.

The solution was then introduced at the top of the ten plates column E. At the fourth plate from the top a bisulfite solution coming from the tank 4 was introduced. Said solution obtained from previous decarbonation was made up from a solution containing approximately 100 gr. $NaHSO_3$ per litre and fed to the column so that the quantity of $NaHSO_3$ was somewhat greater than the equivalent quantity of $NaHCO_3$. At the bottom of the column live steam was introduced at 5, so that the discharged solution had a temperature of 100° C. at the liquid seal 6. No appreciable quantity of steam was removed at the top of the column. Most of the pure carbon dioxide stripped from the top was drawn through the second stripping tower D, was then compressed and forced into the first carbonation tower A. Another portion of the pure carbon dioxide obtained was compressed directly and forced into the recarbonation tower C. The excess of the carbon dioxide leaving through the liquid seal 7 was about 50% of the carbon dioxide combined as carbonate in the original soda smelt. Discharged sulfite solution was substantially freed from carbon dioxide and had a pH-value of 7.3. The thiosulfate content of the cooking liquor prepared from the discharged solution was 0.4 gr. $Na_2S_2O_3$ per litre, which means that the increase of thiosulfate during the whole recovery process corresponded only to 0.1 gr. $Na_2S_2O_3$ per litre cooking liquor containing 10 gr. $Na_2O$ per litre.

In a parallel test the solution coming from the first stage thus without recarbonation and repeated stripping of the hydrogen sulfide by means of pure carbon dioxide was directly reacted with bisulfite solution in the same manner as described above. In this case the thiosulfate amount of the finished cooking liquor increased to 1.0 gr. per litre correspond to an increase of $Na_2S_2O_3$ during the recovery process of 0.7 gr. $Na_2S_2O_3$ per litre cooking liquor containing 10 gr. $Na_2O$ per litre.

Having now particularly described and ascertained the nature of our said invention and which manner the same is to be performed, we declare that what we claim is:

1. A method for recovering sulfur and alkali from waste liquors derived from the digestion of lignocellulosic materials with a cooking liquor containing a sulfur compound selected from the group consisting of alkali sulfites and bisulfites subsequent to evaporating and burning the liquors to smelt soda without any apreciable formation of thiosulfate, in which a solution of said smelt soda is carbonated in a first stage at a pressure of at least about atmospheric pressure by means of at least substantially pure oxygen-free carbon dioxide to convert the soda and the alkali metal sulfide of the solution at least substantially completely into bicarbonate, the carbonated solution is freed from the main portion of the sulfide sulfur by stripping by means of a material selected from the group consisting of steam under vacuum, air and flue gas, the solution is recarbonated in a second stage by means of carbon dioxide at a pressure of at least about atmospheric pressure, remaining sulfide sulfur is stripped by means of at least substantially pure oxygen-free carbon dioxide which is thereafter used for the carbonation in the first stage, and the hydrogen sulfide-free bicarbonate solution obtained is reacted in solution with a sulfur compound selected from the group consisting of alkali bisulfites, sulfurous acid and sulfur dioxide to remove at least substantially completely the carbon dioxide used for the above mentioned carbonation in the both stages and for the stripping in the second stage.

2. The method of claim 1 in which the entering smelt soda solution has such a concentration of soda and alkali metal sulfide that the bicarbonate formed on carbonation will remain in solution.

3. The method of claim 1 wherein the stripping of the smelt soda solution carbonated in the first stage is carried out at an absolute pressure of 50–300 mm. Hg and at a temperature corresponding to the boiling temperature of the solution at the pressure mentioned.

4. The method of claim 3 in which 5–25% of distilled water are removed by the stripping of carbonated solution in the first stage.

5. The method of claim 1 wherein the stripping of hydrogen sulfide in the first stage is performed by means of an uncondensable gas.

6. The method of claim 1 wherein, before carbonation of the second stage, the solution is diluted to such an extent that the bicarbonate formed remains in solution.

7. The method of claim 1 wherein the hydrogen sulfide-free solution obtained from the second stage is freed from carbon dioxide by reacting the hydrogen sulfide-free solution, at elevated temperature, with a sulfur compound selected from the group consisting of alkali bisulfites, sulfurous acid and sulfur dioxide.

8. A method for recovering sulfur and alkali from waste liquors derived from the digestion of lignocellulosic materials with a cooking liquor containing a sulfur compound selected from the group consisting of alkali sulfites and bisulfites subsequent to evaporating and burning the liquors to smelt soda without any appreciable formation of thiosulfate, in which a solution of said smelt soda is carbonated in a first stage at a pressure of 0–5 atmospheres gage pressure and at a temperature of 10–80° C. by means of at least substantially pure oxygen-free carbon dioxide to convert the soda and the alkali metal sulfide of the solution at least substantially completely into bicarbonate, the carbonated solution is freed from the main portion of the sulfide sulfur by stripping by means of a material selected from the group consisting of steam under vacuum, air and flue gas, the solution is recarbonated in a second stage by means of carbon dioxide at a pressure of 0–5 atmospheres gage pressure and at a temperature of 10–80° C., remaining sulfide sulfur is stripped by means of at least substantially pure oxygen-free carbon dioxide which is thereafter used for the carbonation in the first stage and the hydrogen sulfide-free bicarbonate solution obtained is reacted in solution with a sulfur compound selected from the group consisting of alkali bisulfites, sulfurous acid and sulfur dioxide to remove at least substantially completely the carbon dioxide used for the above-mentioned carbonation in the both stages and for the stripping in the subsequent stage.

9. The method of claim 8 wherein the entering smelt soda solution has such a concentration of soda and alkali sulfide that the bicarbonate formed on carbonation will remain in solution.

10. The method of claim 8 wherein the stripping of the smelt soda solution in the first stage is carried out at an absolute pressure of 50–300 mm. Hg and at a temperature corresponding to the boiling temperature of the solution at the pressure mentioned.

11. The method of claim 8 wherein the stripping of hydrogen sulfide in the first stage is performed by means of an uncondensable gas.

12. The method of claim 8 wherein, before carbonation of the second stage, the solution is diluted to such an extent that the bicarbonate formed remains in solution.

13. The method of claim 8 wherein hydrogen sulfide-free solution obtained from the second stage is freed from carbon dioxide by reacting the hydrogen sulfide-free solution, at elevated temperature, with a sulfur compound selected from the group consisting of alkali bisulfites, sulfurous acid and sulfur dioxide.

References Cited in the file of this patent

UNITED STATES PATENTS

| | | |
|---|---|---|
| 1,864,619 | Richter | June 28, 1932 |
| 1,904,170 | Richter | Apr. 18, 1933 |
| 2,675,297 | Gray et al. | Apr. 13, 1954 |